April 9, 1946.  J. A. LIND  2,397,968
FISH LURE
Filed Dec. 6, 1943
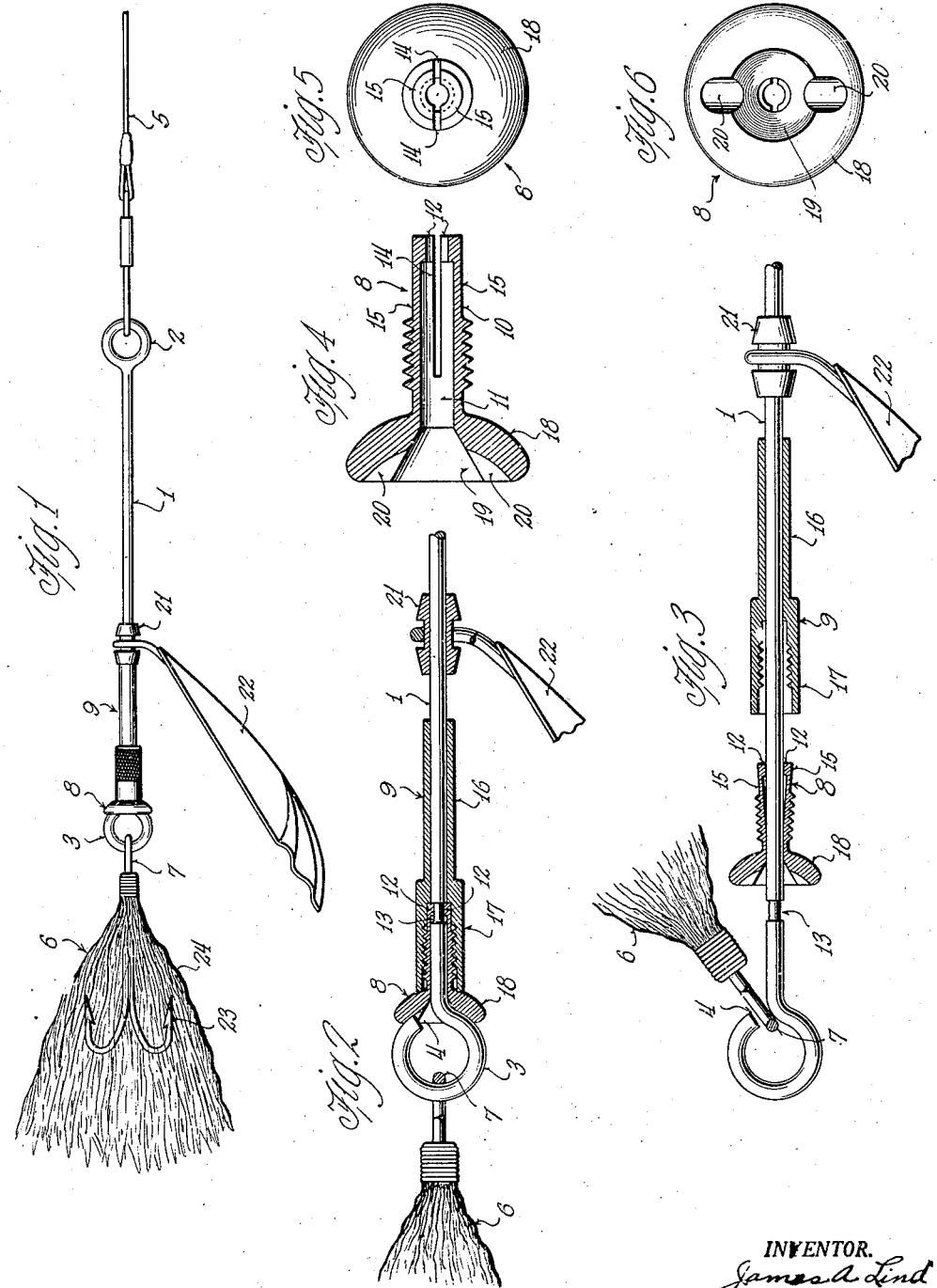
INVENTOR.
James A Lind Patented Apr. 9, 1946

2,397,968

UNITED STATES PATENT OFFICE 2,397,968

FISH LURE

James A. Lind, Chicago, Ill.

Application December 6, 1943, Serial No. 513,001

4 Claims. (Cl. 43—28)

This invention relates to improvements in spoon hooks for fishing.

One object of my invention is to provide a stem or rod with a partially open loop so that various hooks, bucktails, or other forms of fishing lures can be readily and quickly attached.

Another object of my invention is to provide threadedly connected inner and outer sleeves on the rod to close the opening in the loop preventing the attachments from disengaging.

Another object of my invention is to provide the inner sleeve with yieldable fingers having lugs to snap into a groove in the rod and be held therein by the outer sleeve to prevent accidental sliding of the sleeves on the rod to release the attachments from the loop.

The invention consists further in the features hereinafter described and claimed.

In the accompanying drawing—

Fig. 1 is a side elevational view of the device of my invention;

Fig. 2 is a longitudinal sectional view of the major portion of the device showing the inner and the outer sleeves in position closing the opening in the loop;

Fig. 3 is a similar sectional view showing the sleeves disconnected and slid back on the rod to open the loop;

Fig. 4 is a longitudinal sectional view of the inner sleeve removed from the rod to more clearly show the yieldable fingers thereof;

Fig. 5 is a front end view of the inner sleeve; and

Fig. 6 is a rear end view of the same.

As shown in the drawing, the device of my invention comprises a supporting rod 1 having an eye 2 at one end and a partially open loop 3 at the other end. The eye 2 and the loop 3 are preferably in the same plane and the opening 4 in the loop faces the eye 2 and is formed by terminating the end of the loop short of the rod as shown herein. The leader 5 of the fish line is attached to the eye 2 and a bucktail 6 or other fish lure is connected to the loop 3. The eye 7 of the lure is passed through the opening 4 to engage the lure with the loop 3 as indicated in Fig. 3.

Slidably mounted on the rod 1 between the eye 2 and the loop 3 are two sleeves 8, 9 for closing the opening 4 in the loop and retaining the lure 6 in connected relation therewith. The sleeves 8, 9 have a telescopic, screw-threaded fit, a head on the inner sleeve 8 closing the opening 4 in the loop 3 and the outer sleeve 9 locking the inner sleeve to the rod in such position as shown in Figs. 1 and 2.

The inner sleeve 8 as detailed in Fig. 4, has a stem or body portion 10 having a bore 11 to receive the rod 1. The bore 11 slidably mounts the inner sleeve on the rod so that said sleeve may be slid on the rod to open and close the opening 4 in the loop 3 and carry the internal lugs 12, 12 on the inner sleeve into and out of register with an annular groove 13 in the rod. The body 10 of the inner sleeve 8 is slotted longitudinally as at 14, 14 to provide a pair of yieldable fingers 15, 15 on the outer ends of which are the lugs 12, one on each finger, to snap into the groove 13 when the parts register. This occurs when the inner sleeve 8 closes the opening 4 in the loop. The diameter of the bore at the lugs 12 conforms to that of the rod at the bottom of the groove and, hence, when the inner sleeve 8 is slid on the rod beyond the groove 13 the fingers 15 will be under tension as shown in Fig. 3. This results in the lugs 12 snapping into the groove on reaching the same.

The outer sleeve 9 has a body portion 16 slidably mounted on the rod beyond the groove 13 and a socket portion 17 which fits over the finger provided body 10 of the inner sleeve. The parts have a screw threaded connection as shown whereby the outer sleeve 9 may be screwed onto the inner sleeve to hold the lugs 12 in the groove 13 as shown in Fig. 2. The inner sleeve 8 has a head portion 18 beyond the outer sleeve 9 and which head portion 18 fits against the loop 3 to close the opening 4. Said head 18 is countersunk as at 19 to receive the loop 3 and has cross-slots or recesses 20, 20 to seat the loop 3 and hold the inner sleeve against turning as the outer sleeve 9 is screwed on and off the same.

Mounted on the rod between the inner end of the outer sleeve 9 and the eye 2 is a swivel 21 to which a spinner blade 22 is revolvably attached. The inner end of the outer sleeve 9 provides a stop for the swivel 21 in the use of the device as shown in Fig. 1.

The shoulders provided by the groove 13 hold the sleeves 8, 9 from sliding on the rod 1 when the parts are locked as herein shown and described. To open the loop to release the lure 6 for replacement or otherwise, the outer sleeve 9 is unscrewed from the inner sleeve 8 and both sleeves are thereupon slid back on the rod towards the eye, the lugs 12 passing out of the groove 13 which is shallow enough for this purpose as shown in Fig. 3.

The locking means shown and described provides a simple and readily releasable lock for a fish lure and positively holds the lure against accidental release when the lugs are held in the groove 13 by the outer sleeve. The attachment 6 of the type shown has its fish hook members 23, 23 inclosed within and concealed by bucktail 24.

The details of construction and arrangement of parts shown and described may be variously changed and modified without departing from the spirit and scope of my invention, except as pointed out in the annexed claims.

I claim as my invention:

1. A fish hook coupling device of the character described comprising, a supporting rod having a partially open loop at one end for connecting an attachment having a fish hook to the rod, and threadedly connected inner and outer sleeves slidably mounted on the rod for closing the loop opening to prevent disengagement of the attachment from the rod, said inner sleeve being slotted longitudinally to provide yieldable fingers to snap into an annular groove in the rod when the sleeve closes said loop opening, and said fingers being held in said groove by the outer sleeve when screwed on the inner sleeve.

2. A fish hook coupling device of the character described comprising, a supporting rod having a partially open loop at one end for connecting an attachment having a fish hook to the rod, threadedly connected inner and outer sleeves slidably mounted on the rod for closing said loop opening to prevent disengagement of the attachment from the rod, and co-acting means on the inner sleeve and the rod and held engaged by the outer sleeve when screwed on the inner sleeve to prevent sliding of the sleeves on the rod when closing the loop opening, said inner sleeve having an end recess with two slots, both opposed to the loop to receive the same to hold the inner sleeve from turning when screwing the outer sleeve on and off the inner sleeve.

3. A fish hook coupling device of the character described comprising, a supporting rod having a partially open loop at one end for connecting an attachment having a fish hook to the rod, threadedly connected inner and outer sleeves slidably mounted on the rod for closing said loop opening to prevent disengagement of the attachment from the rod, said inner sleeve being slotted longitudinally to provide yieldable fingers, and lugs on the fingers to snap into an annular groove in the rod when the inner sleeve closes said loop opening, said lugs being held in said groove by the outer sleeve when screwed on the inner sleeve over said fingers, said inner sleeve having a bore to receive the rod with the portion of the bore at the lugs sufficient to place the fingers under tension when engaged with the rod beyond the groove.

4. A fishing fixture of the character described comprising, a supporting rod having a partially open loop at one end for connecting an attachment having a fish hook to the rod, threadedly connected inner and outer sleeves slidably mounted on the rod for closing said loop opening to prevent disengagement of the attachment from the rod, co-acting means on the inner sleeve and the rod and held by the outer sleeve when screwed on the inner sleeve to prevent sliding of the sleeves on the rod when closing the loop opening, and means on the inner sleeve and having interlocking connection with the loop adjacent its opening on sliding the inner sleeve into engagement with the loop for holding the inner sleeve against rotation when screwing the outer sleeve on and off the inner sleeve.

JAMES A. LIND.